United States Patent
Frehner et al.

(10) Patent No.: US 12,422,056 B2
(45) Date of Patent: Sep. 23, 2025

(54) VALVE, IN PARTICULAR A VACUUM VALVE

(71) Applicant: VAT Holding AG, Haag (CH)

(72) Inventors: Hanspeter Frehner, Sevelen (CH); Martin Netzer, Bludenz (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 18/275,067

(22) PCT Filed: Jan. 25, 2022

(86) PCT No.: PCT/EP2022/051525
§ 371 (c)(1),
(2) Date: Jul. 31, 2023

(87) PCT Pub. No.: WO2022/167250
PCT Pub. Date: Aug. 11, 2022

(65) Prior Publication Data
US 2024/0133486 A1   Apr. 25, 2024
US 2024/0229969 A9   Jul. 11, 2024

(30) Foreign Application Priority Data
Feb. 5, 2021 (DE) .......................... 102021102702.0

(51) Int. Cl.
*F16K 41/10* (2006.01)
*F16K 1/36* (2006.01)
(Continued)

(52) U.S. Cl.
CPC .............. *F16K 41/106* (2013.01); *F16K 1/36* (2013.01); *F16K 27/029* (2013.01); *F16K 41/043* (2013.01); *F16K 51/02* (2013.01)

(58) Field of Classification Search
CPC ...... F16K 41/106; F16K 41/043; F16K 41/10; F16K 1/36; F16K 27/029; F16K 51/02; F16K 3/06; F16K 3/10; F16K 3/18
(Continued)

(56) References Cited

U.S. PATENT DOCUMENTS

| 3,343,562 A | 9/1967 | Combes |
| 4,089,505 A | 5/1978 | Anderle et al. |

(Continued)

FOREIGN PATENT DOCUMENTS

| EP | 2551564 | 1/2013 |
| EP | 3211281 | 8/2017 |

(Continued)

OTHER PUBLICATIONS

Valve Drawing, admitted prior art, Jan. 1, 2021.

*Primary Examiner* — Craig M Schneider
*Assistant Examiner* — Andrew J Rost
(74) *Attorney, Agent, or Firm* — Volpe Koenig (57) ABSTRACT

A valve on which a valve plate is arranged in a valve housing interior space of a valve housing and fixed to a shaft, in which the valve plate together with the shaft can be displaced back and forth in directions parallel to a shaft longitudinal axis between a closed position and an intermediate position, and by rotation of the shaft about the shaft longitudinal axis can be pivoted back and forth between the intermediate position and a maximum open position. A shaft leadthrough for sealing the shaft with respect to the valve housing has a bellows which can be expanded and pushed together in the directions parallel to the shaft longitudinal axis, a first bellows end of this bellows being fixed to the valve housing, and a shaft sealing ring in which the shaft is rotatably mounted, being arranged on a second bellows end.

16 Claims, 5 Drawing Sheets

(51) Int. Cl.
  *F16K 27/02* (2006.01)
  *F16K 41/04* (2006.01)
  *F16K 51/02* (2006.01)
(58) Field of Classification Search
  USPC .................................................. 251/335.2
  See application file for complete search history.

(56) References Cited

U.S. PATENT DOCUMENTS

| | | | | |
|---|---|---|---|---|
| 5,037,065 | A * | 8/1991 | Hirz | ............... F16K 41/106 277/377 |
| 5,116,023 | A * | 5/1992 | Contin | .................. F16K 51/02 251/158 |
| 5,385,334 | A * | 1/1995 | Greenwood | ............ F16K 1/10 251/332 |
| 6,409,149 | B1 * | 6/2002 | Maher, Jr. | ............... F16K 3/06 251/301 |
| 6,902,145 | B2 | 6/2005 | Latzer et al. | |
| 8,424,843 | B2 * | 4/2013 | Ehrne | .................. F16K 51/02 251/301 |
| 2007/0228314 | A1 | 10/2007 | Geiser | |
| 2007/0290157 | A1 * | 12/2007 | Schoen | .................. F16K 3/10 251/187 |
| 2008/0017820 | A1 | 1/2008 | Ehrne | |
| 2008/0017822 | A1 * | 1/2008 | Schoen | .................. F16K 3/18 251/158 |
| 2009/0057596 | A1 | 3/2009 | Coleman et al. | |
| 2011/0168937 | A1 | 7/2011 | Ehrne | |
| 2013/0025704 | A1 | 1/2013 | Lamprecht et al. | |
| 2017/0356569 | A1 | 12/2017 | Netzer et al. | |
| 2019/0056035 | A1 | 2/2019 | Boehm et al. | |

FOREIGN PATENT DOCUMENTS

| | | |
|---|---|---|
| EP | 3258149 | 12/2017 |
| GB | 990624 | 4/1965 |
| JP | 6776903 | 10/2020 |
| WO | 2010026100 | 3/2010 |

* cited by examiner

VALVE, IN PARTICULAR A VACUUM VALVE

CROSS-REFERENCE TO RELATED APPLICATIONS

This application is a 371 National Phase of PCT/EP2022/051525, filed Jan. 25, 2022, which claims priority from German Patent Application No. 10 2021 102 702.0, filed Feb. 5, 2021, both of which are incorporated herein by reference as if fully set forth.

TECHNICAL FIELD

The present invention relates to a valve, in particular a vacuum valve, having a valve housing and having a valve opening, which is surrounded by a valve seat, and having a valve plate, wherein the valve plate is arranged in an interior space of the valve housing and is fixed on a shaft, wherein the valve plate, together with the shaft can be displaced back and forth in directions parallel to a longitudinal axis of the shaft between a closed position, in which the valve plate has been pushed against the valve seat and closes the valve opening, and an intermediate position, in which the valve plate has been raised up from the valve seat and coincides with the valve opening, and wherein the valve plate can be pivoted back and forth, by rotation of the shaft about the longitudinal axis of the shaft, between the intermediate position and a fully open position, in which the valve plate completely or partially frees the valve opening, and the shaft is sealed in relation to the valve housing by means of a shaft feedthrough, in which the shaft can be rotated about its longitudinal axis and can be displaced in directions parallel to the longitudinal axis.

BACKGROUND

Valves of this type are known, for example, from US 2007/0228314 A1. They are usually used to close openings in a process chamber. They can possibly also control a volumetric flow of a fluid flowing into the chamber or flowing out of the chamber. The valves are fitted on the process chamber, by way of their valve housing, such that the valve opening is in alignment with the chamber opening and therefore the chamber opening can be opened and closed by means of the valve.

It is usually the case with such valves that the interior space of the valve housing has to be separated in a gas-tight manner from the region outside the valve housing. For this purpose, the prior art makes use of shaft feedthroughs, which on the one hand ensure appropriate sealing, but on the other hand make it possible for the shaft, in the shaft feedthroughs, to be rotated about its longitudinal axis and displaced in the directions parallel to the longitudinal axis. For the purpose of sealing the valve housing in relation to the shaft, US 2007/0228314 A1 makes use, in the shaft feedthrough, of two O-rings in which the shaft, on the one hand, can be displaced in the directions parallel to its longitudinal axis and, on the other hand, is mounted such that it can be rotated about the longitudinal axis. The disadvantage of using such a shaft feedthrough like that in US 2007/0228314 A1 resides, on the one hand, in grease entrainment and, on the other hand, also in gas entrainment when the shaft and sealing rings interact. Moreover, this prior art also involves a relatively high level of wear over time in the region of the sealing ring and shaft.

JP 6776903 B2 discloses a valve of the type in question in which the shaft in the shaft feedthrough is sealed in relation to the valve housing by means of magnetic fluid-sealing mechanisms, which involves relatively high outlay. This document also discloses examples in which a bellows is used for the purpose of connecting the valve housing to a drive housing, which accommodates the drive for the shaft.

SUMMARY

The object of the invention is to provide, for valves of the type mentioned in the introduction, a shaft feedthrough which, on the one hand, can be realized relatively cost-effectively but, on the other hand, also achieves a particularly good level of sealing and durability.

In order to achieve this object, the invention proposes a valve having one or more of the features disclosed herein.

Provision is therefore made according to the invention so that, for the purpose of sealing the shaft in relation to the valve housing, the shaft feedthrough has a bellows, which can be expanded and pushed together in the directions parallel to the longitudinal axis of the shaft and is fixed on the valve housing by way of a first bellows end, and wherein a shaft-sealing ring is arranged at a second end of the bellows, the second bellows end being located opposite the first bellows end, and the shaft is mounted in the shaft-sealing ring such that it can be rotated about the longitudinal axis of the shaft relative to the bellows.

By means of the shaft-sealing ring, which is arranged at the second end of the bellows of the shaft feedthrough, the shaft is mounted in the bellows such that it can rotate about its longitudinal axis relative to the bellows. The ability of the bellows to be expanded and pushed together in the directions parallel to the longitudinal axis of the shaft however, makes it possible for the second bellows end with the shaft-sealing ring to follow the shaft in the directions parallel to the longitudinal axis of the shaft during movement back and forth, so that there is relative movement between the shaft-sealing ring and shaft only in a circumferential direction of the shaft, but not in a longitudinal direction of the shaft. This considerably reduces the likelihood of such a shaft feedthrough to entrain grease and gas in comparison with the prior art. Moreover, the level of abrasion on the shaft and on the shaft-sealing ring is lower than in the case of the prior art. In addition, it should be pointed out that such a solution in which the shaft-feedthrough has, on the one hand, a bellows and, on the other hand, the shaft-sealing ring can be realized in a relatively cost-effective and straightforward manner.

Provision is advantageously made here for the shaft to be sealed in relation to the bellows by means of the shaft-sealing ring and to be isolated from the bellows in respect of rotary movements of the shaft about the longitudinal axis of the shaft by means of the shaft-sealing ring. This ensures that, when the shaft rotates about its longitudinal axis, the bellows is not rotated along with the shaft.

In order to prevent and relative movement between the second bellows end and the shaft in the direction parallel to the longitudinal axis of the shaft, preferred embodiments of the invention provide for the shaft-sealing ring to be arranged on a seal carrier and for the bellows to be fixed on the seal carrier by way of its second bellows end, wherein the seal carrier is positively coupled to the shaft in respect of displacement movements of the shaft in the directions parallel to the longitudinal axis of the shaft. As a result of this positive coupling in relation to the displacement movements of the shaft in the directions parallel to the longitudinal axis of the shaft, the second bellows end, and therefore also the shaft-sealing ring arranged there, does not move relative to the shaft in the directions parallel to the longitudinal axis of the shaft.

In preferred embodiments, the bellows of the shaft-feedthrough can be a so-called folding bellows. However, it is also possible, in principle, to use other embodiments of a bellows which are known per se in the prior art. The bellows advantageously has an interior space, through which the shaft is guided. The shaft could also be referred to as an axial pin or the like. Correspondingly, the longitudinal axis of the shaft could then also be referred to as the longitudinal axis of the axial pin.

If expedient, it is of course also possible to provide more than one of all the components which are referred to in the singular. Thus, to name but one example, it is possible for the valve housing to have, e.g. in addition to the valve opening which can be closed by means of the valve plate, a further valve opening, which is located opposite and is arranged, in particular, in alignment with the first-mentioned valve opening.

The valve plate is advantageously arranged eccentrically in respect of the longitudinal axis of the shaft, or—in other words—of the shaft. In preferred embodiments, the longitudinal axis of the shaft is advantageously normal to a closing plane which is defined by the valve seat, and in which the valve plate butts against the valve seat in the closed position. It is preferably the case that valves according to the invention are therefore designed in the form of so-called pendulum valves. For sealing purposes in the closed position, it is possible for seals which are known from the prior art to be fitted both on the valve seat and on the valve plate. This is known per se and need not be explained in any more detail.

In the case of valves according to the invention with a corresponding shaft feedthrough, it is possible to realize particularly large travel distances between the closed position and the intermediate position, in which the valve plate has been raised up from the valve seat and still coincides with the valve opening. As measured in the direction parallel to the longitudinal axis of the shaft, by means of valves according to the invention, it is possible to realize travel distances of the valve plate between the closed position and the aforementioned intermediate position in the range from 3 mm to 65 mm, preferably in the range from 10 mm to 35 mm.

Depending on the field of application and use of the valves according to the invention, it may be necessary from time to time to allow a highly corrosive or otherwise aggressive fluid, in particular gas, to flow into the interior space of the valve housing. For example, it is possible to use such fluids or gases for the purpose of cleaning the surfaces of the interior space of the valve housing and of the valve plate. So that the shaft feedthrough according to the invention is not adversely affected in the process, preferred variants of the invention can make provision so that the valve housing has arranged on it a sealing ring, through which the shaft is guided, wherein in the closed position of the valve plate and in the fully open position of the valve plate and in all the intermediate positions of the valve plate between the closed position and the fully open position, between the shaft and the sealing ring of the valve housing, an overflow opening remains free between an interior space of the bellows and the interior space of the valve housing and, starting from the fully open position, the shaft can be displaced, in one of the directions parallel to the longitudinal axis of the shaft, into a service position, in which the sealing ring of the valve housing butts with sealing action against the shaft and seals the interior space of the bellows in relation to the interior space of the valve housing. In the case of such embodiments, in the service position, the interior space of the bellows is sealed in relation to the interior space of the valve housing by the sealing ring of the valve housing. This means that, in the service position, the aforementioned fluids, in particular gases, can be directed into the interior space of the valve housing without being able to penetrate into the interior space of the bellows. As a result, the interior space of the bellows, and therefore the shaft feedthrough as a whole, can then be protected against the possibly highly corrosive or otherwise aggressive fluids and gases.

Provision is particularly preferably made, in the case of such embodiments, for the shaft to have a first shaft portion and a second shaft portion, wherein the shaft has a larger diameter in the second shaft portion than in the first shaft portion and, in the service position, the sealing ring of the valve housing butts with sealing action against the second shaft portion of the shaft.

It is conceivable and possible, in principle, for the shaft, together with the valve plate, to be manually rotated about its longitudinal axis and/or displaced in the directions parallel to its longitudinal axis. However, preferred embodiments of the invention provide for the valve to have a valve drive for rotating the shaft, together with the valve plate, about the longitudinal axis of the shaft and for displacing the shaft, together with the valve plate, in the directions parallel to the longitudinal axis of the shaft. A wide variety of different embodiments of such valve drives are known per se. Appropriately different designs thereof can also be used for valves according to the invention.

Preferred embodiments of the invention provide for the valve drive to be arranged in a drive housing and for the bellows to be fixed on a carrier body by way of its first bellows end, wherein, for the purpose of fixing the first bellows end on the valve housing, the carrier body is clamped in between the drive housing and the valve housing. It is particularly advantageous here if the carrier body is clamped in between the drive housing and the valve housing with the interposition of a carrier-body seal.

Sealing rings which are known per se and are made of elastomer or metal can be used as shaft-sealing ring, as sealing ring for the valve housing and also for the carrier-body seal. Use is particularly preferably made here of so-called O-rings. Depending on the requirements which the valve has to meet, it is possible to use sealing rings or O-rings which are known from the prior art.

As already explained above, the valve drives for valves according to the invention can be configured in very different ways. It is possible here to make use of numerous variants which are known per se from the prior art. However, a preferred variant of valves according to the invention provides for the valve drive to have a longitudinal drive and a rotary drive and a yoke, wherein the shaft is mounted in the yoke such that it can be rotated about its longitudinal axis by the rotary drive, and the shaft is positively coupled to the yoke in respect of the directions parallel to the longitudinal axis of the shaft, and the yoke, together with the shaft, can be displaced in directions parallel to the longitudinal axis of the shaft by the longitudinal drive. In such embodiments, provision is particularly preferably made so that, for positive coupling to the shaft, the seal carrier, on which the shaft-sealing ring is arranged, is fixed on the yoke in respect of the displacement movements of the shaft in the directions parallel to the longitudinal axis of the shaft.

The valve according to the invention is advantageously a so-called vacuum valve, that is to say a valve which can be used in so-called vacuum technology. Vacuum technology is usually involved in the case of operating states with pressures smaller than or equal to 0.001 mbar (millibars) or 0.1 Pascals. Vacuum valves are valves which are designed for these pressure ranges and/or corresponding differences in pressure in relation to the surroundings. However, vacuum valves can also generally be defined as being designed for pressures below normal pressure, that is to say below 1 bar.

BRIEF DESCRIPTION OF THE DRAWINGS

Further features and details of preferred embodiments of the invention will be explained hereinbelow by way of example with reference to an exemplary embodiment. In the figures.

DETAILED DESCRIPTION

The example of a valve 1 according to the invention which is shown in the figures is a vacuum valve. It has a valve housing 2, a valve opening 4 and a valve plate 5. The valve plate 5 can close the valve opening 4 in the closed position of the valve 1, the closed position being illustrated in FIG. 1. For this purpose, in the closed position, the valve plate 5 is pushed against the valve seat 3 in a manner known per se. Seals can be arranged in a manner known per se on the valve seat 3 and/or on the valve plate 5. For the sake of completeness, it is noted that, with corresponding modification of the exemplary embodiment shown here, the valve seat 3 can also surround the further valve opening 28, so that, in the closed position, the valve plate 5 then closes the further valve opening 28.

Figure 2:
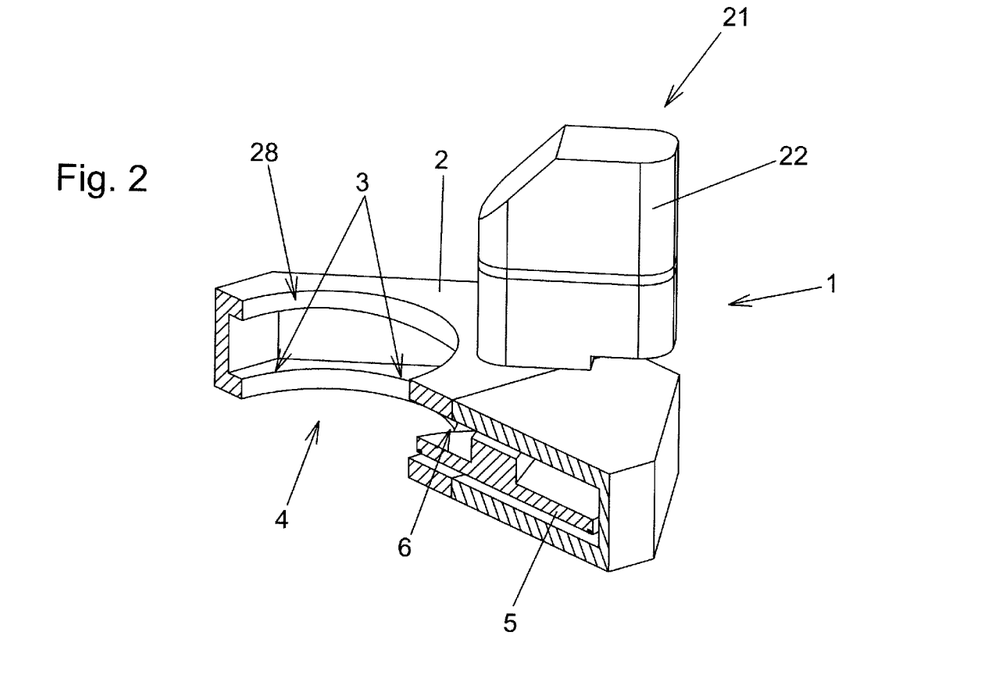
FIG. 2 shows a perspective illustration of a longitudinal section, in schematized form, through the valve housing of the valve from FIG. 1.

FIG. 2 shows a perspective illustration of a longitudinal section in which the valve plate 5 is located in the fully open position. In this position, it frees the valve opening 4—in the exemplary embodiment shown here—fully or, in other words, completely. It is, of course, also conceivable to have exemplary embodiments of the invention in which, in the fully open position, the valve plate 5 only partially frees the valve opening 4.

Figure 1:
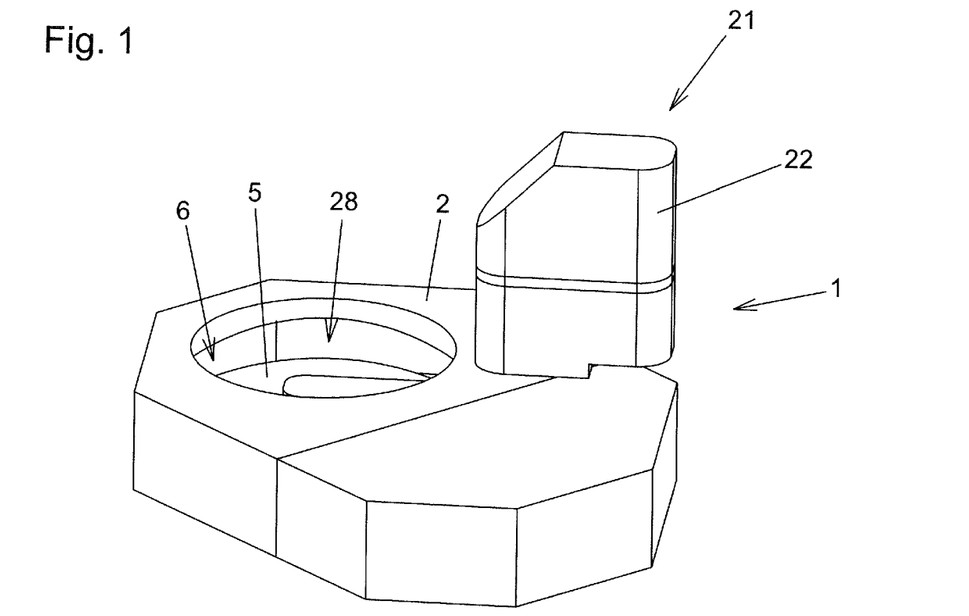
FIG. 1 shows a perspective view, in schematized form, from the outside of a valve designed according to the invention.

The valve seat 3 surrounds the valve opening 4 and, in this embodiment and also in other preferred embodiments of the invention, is formed on the valve housing 2. The valve plate 5 is arranged in the interior space 6 of the valve housing 2 and is fixed on a shaft 7 (not visible in FIGS. 1 and 2). The valve plate 5, together with the shaft 7, can be displaced back and forth in the direction 8 parallel to the longitudinal axis 9 of the shaft 7, the longitudinal axis of the shaft being depicted in FIGS. 3 to 6, between the closed position, in which the valve plate has been pushed against the valve seat 3 and closes the valve opening 4, and an intermediate position, in which the valve plate has been raised up from the valve seat 3 and coincides with the valve opening 4. By rotation of the shaft 7 about the longitudinal axis 9, the valve plate 5 can be pivoted back and forth between the aforementioned intermediate position and the fully open position, which is illustrated in FIGS. 2 and 5. In the exemplary embodiment shown, and also in other preferred variants, the valve 1 has a valve drive 21 for rotating the shaft 7, together with the valve plate 5, about the longitudinal axis 9 of the shaft and for displacing the shaft 7, together with the valve plate 5, in the directions 8 parallel to the longitudinal axis 9 of the shaft. In the exemplary embodiment shown, the valve drive 21 is arranged in a drive housing 22. In FIGS. 1 and 2, only the drive housing 22 can be seen from the outside.

In the exemplary embodiment shown here, the valve housing 2 has, in addition to the valve opening 4, which can be closed by means of the valve plate 5, a further valve opening 28. In this embodiment and also in other preferred embodiments, this further valve opening is located opposite the valve opening 4 and in alignment therewith. However, this is not necessarily the case. It would also be possible for the valve housing 2 to be designed for example in principle such that it has just one valve opening 4 or also more than one additional or further valve openings 28.

Figure 3:
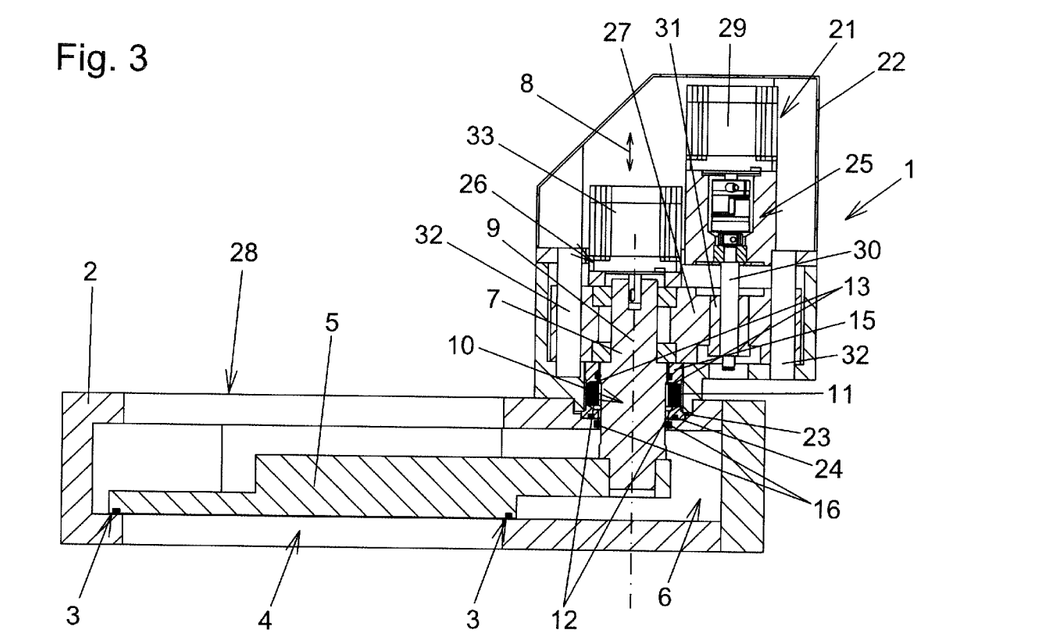
FIGS. 3 to 6 each show vertical sections through the valve according to FIGS. 1 and 2, and FIGS. 7 to 10 show detail-specific illustrations, associated with FIGS. 3 to 6, in the region of the shaft feedthrough.
Figure 4:
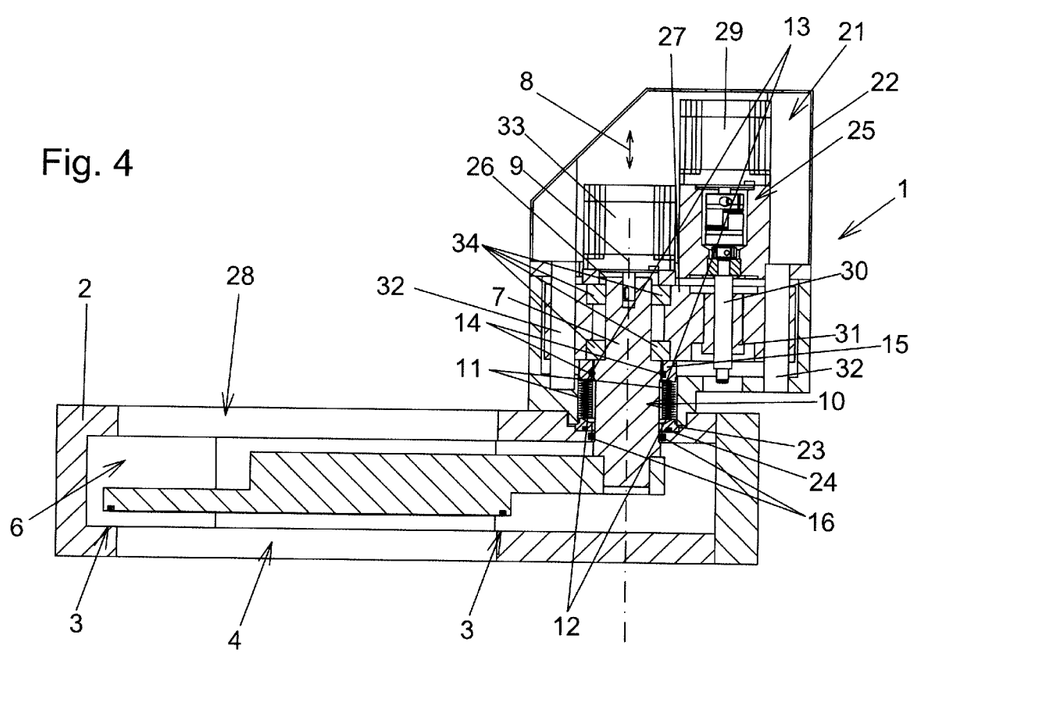
Figure 5:
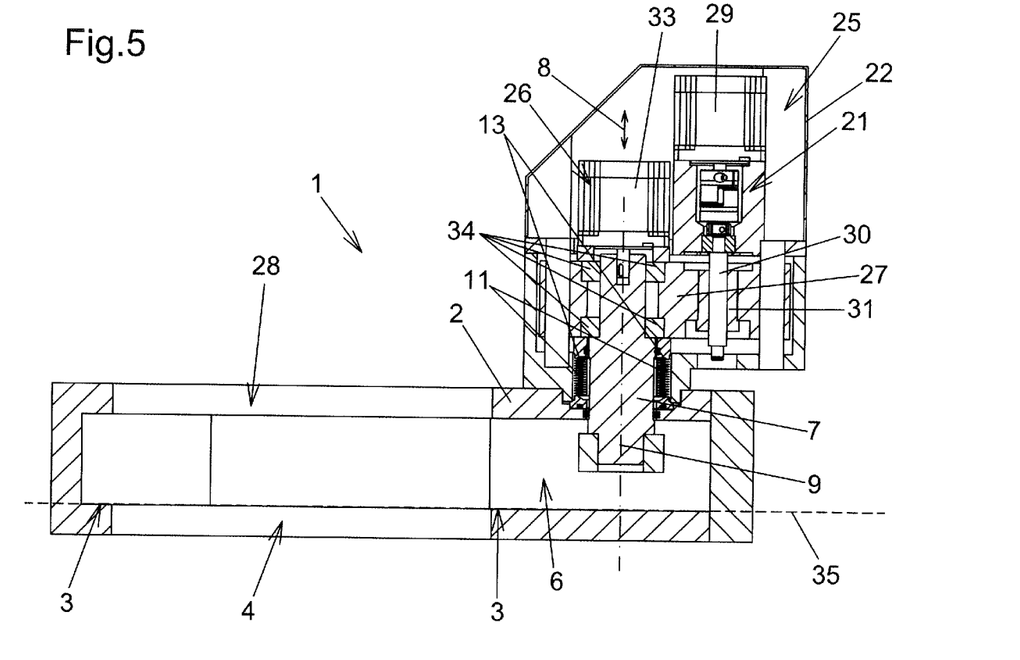

FIGS. 3 to 6, then, show vertical sections through the exemplary embodiment according to the invention of the valve 1 from FIGS. 1 and 2. FIG. 3 here shows the closed position, in which the valve plate 5 has been pushed against the valve seat 3 and closes the valve opening 4. FIG. 4 shows the intermediate position, in which the valve plate 5 has already been raised up from the valve seat 3 but still coincides with the valve opening 4. Between the closed position according to FIG. 3 and the intermediate position according to FIG. 4, the valve plate 5, together with the shaft 7 fixed thereon, can be displaced back and forth in directions 8 parallel to the longitudinal axis 9 of the shaft. FIG. 5 shows the fully open position of the valve 1 illustrated here. In this figure, the valve plate 5 frees the valve opening 4 fully. The valve plate 5 here has been pivoted away rearward in the interior space 6 of the valve housing, so that it is no longer visible in FIG. 5. As has been said, it is also possible to have exemplary embodiments according to the invention which are not illustrated explicitly here and in which, in the fully open position, the valve plate 5, rather than freeing the valve opening 4 fully or completely, only partially frees the valve opening.

Between the intermediate position according to FIG. 4 and the fully open position according to FIG. 5, it is possible, at any rate, for the valve plate, together with the shaft 7, to be pivoted back and forth by rotation of the shaft 7 about the longitudinal axis 9 of the shaft.

Figure 6:
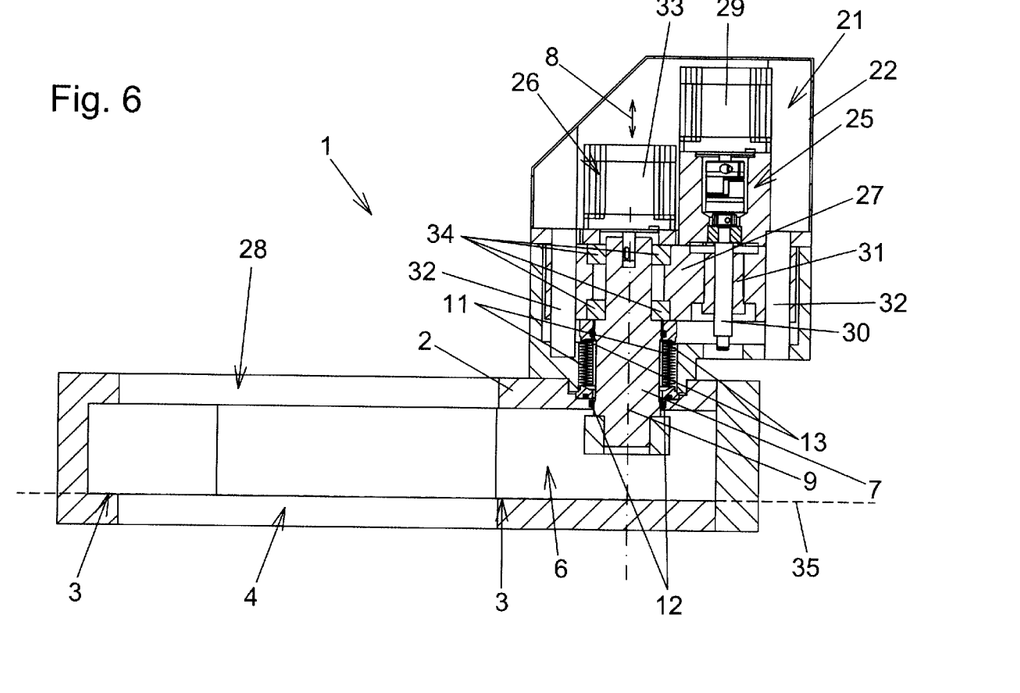

FIG. 6 shows a service position, in which the interior space 18 of the bellows 11 has been closed by means of the sealing ring 16 of the valve housing. This will be discussed in more detail at a later stage in the text.

At any rate it is the case for the valve 1 according to the invention shown here, and also in other preferred embodiments of the invention, that the longitudinal axis 9 of the shaft, about which the shaft 7 rotates and the valve plate 5 pivots, is normal to the closing plane 35, which is defined by the valve seat 3 and is depicted by way of example in FIGS. 5 and 6.

Figure 7:
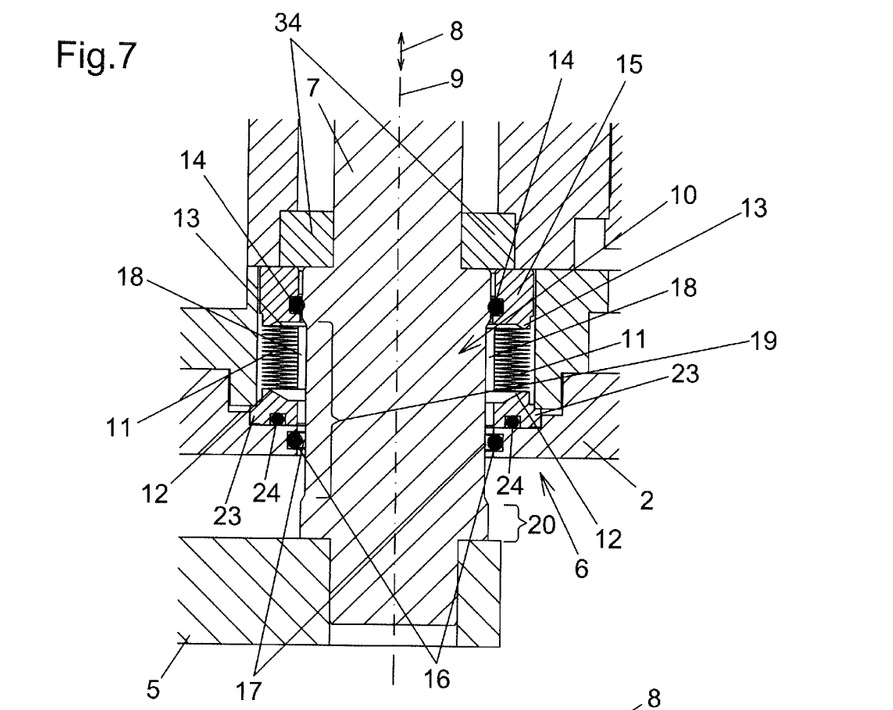
Figure 8:
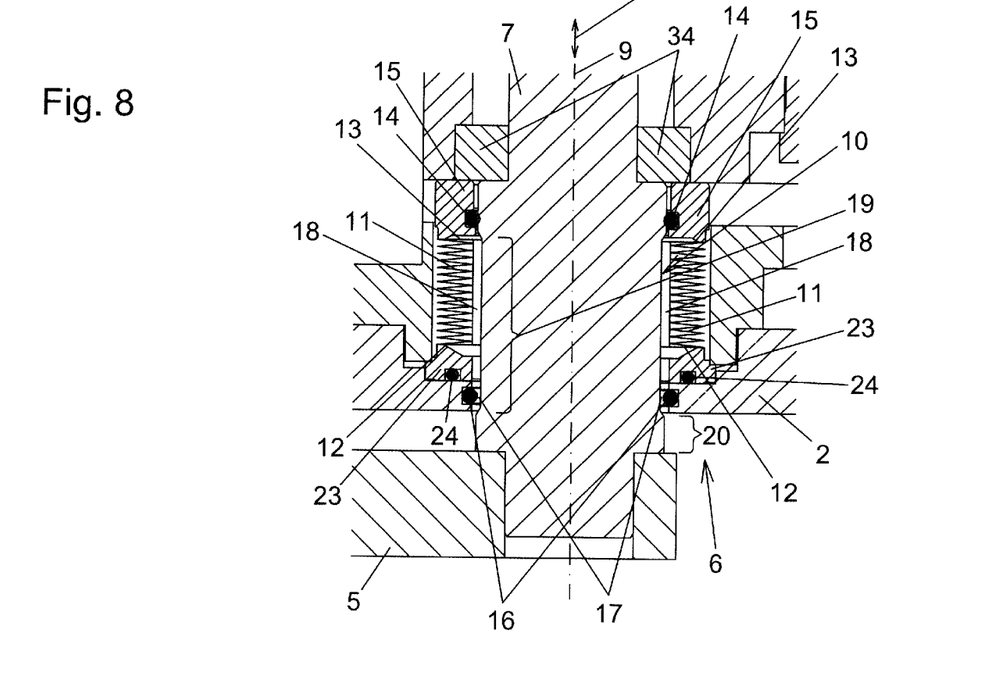
Figure 9:
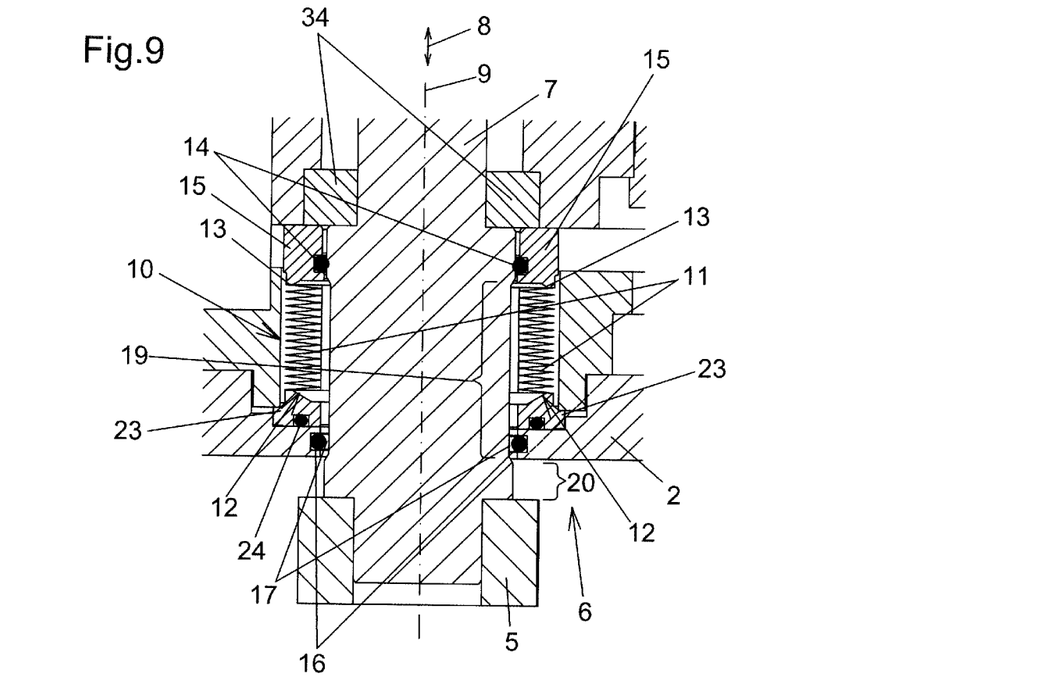
Figure 10:
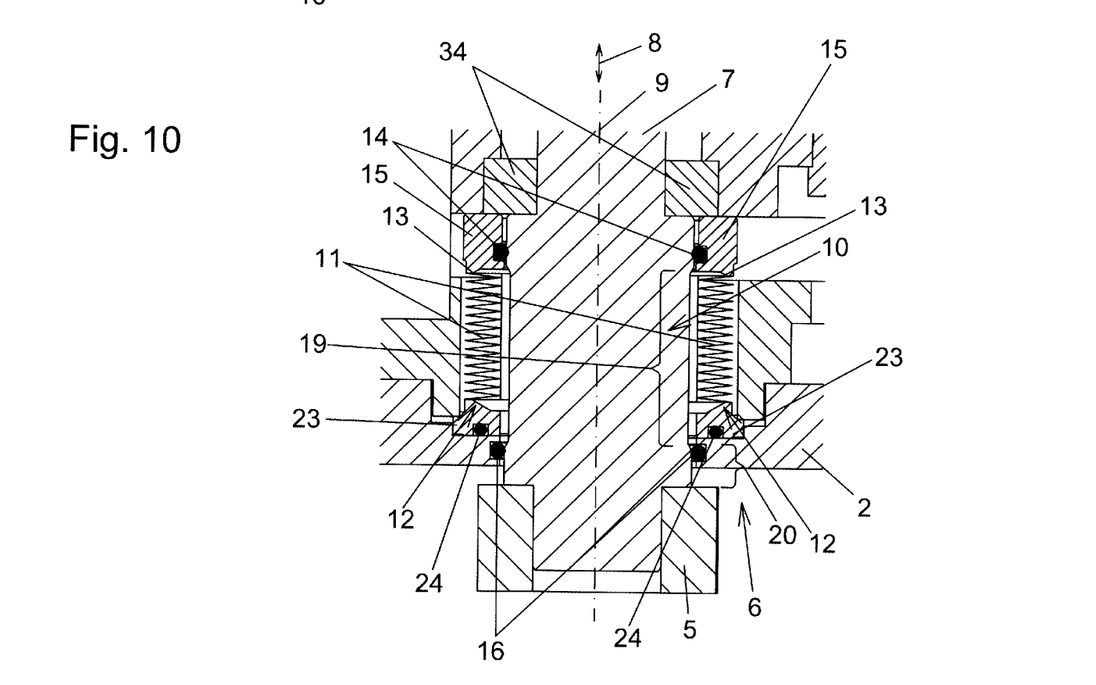

FIGS. 7 to 10 show, on an enlarged scale, the region of the shaft feedthrough 10 designed according to the invention and belonging to the valve 1 according to FIGS. 1 to 6. FIG. 7 here shows the state in the closed position according to FIG. 3. FIG. 8 shows the corresponding state in the intermediate position according to FIG. 4. FIG. 9 illustrates this region in the open position according to FIG. 5, and FIG. 10 shows the state in the service position according to FIG. 6.

On the one hand, the shaft 7 is mounted in the shaft feedthrough 10 such that it can be rotated about its longitudinal axis 9. On the other hand, the shaft 7 is mounted in the shaft feedthrough 10 such that it can also be displaced in the directions 8 parallel to the longitudinal axis 9. In particular, however, the shaft feedthrough 10 also serves to seal the shaft 7 in relation to the valve housing 2. For this purpose, provision is then also made according to the invention, in the case of this exemplary embodiment, so that, for the purpose of sealing the shaft 7 in relation to the valve housing 2, the shaft feedthrough 10 has the bellows 11, which can be expanded and pushed together in the directions 8 parallel to the longitudinal axis 9 of the shaft. In this embodiment and also in other preferred embodiments, this bellows is designed in the form of a folding bellows which is known per se. The first bellows end 12 is fixed on the valve housing 2. For this purpose, the bellows end 12 can correspondingly be fastened directly on the valve housing 2. In the exemplary embodiment shown here, however, this fixing of the bellows end 12 on the valve housing 2 is achieved by the first bellows end 12 being fixed on a carrier body 23, which in this example is likewise designed in ring form, wherein the carrier body 23 is clamped in between the drive housing 22 and the valve housing 2. In order to achieve corresponding sealing, provision is advantageously made—and this is also the case realized here—for the carrier body 23 to be clamped in between the drive housing 22 and the valve housing 2 with the interposition of a carrier-body seal 24.

It is also the case in this exemplary embodiment that a shaft-sealing ring 14 is arranged according to the invention at the second end 13 of the bellows 11, the second bellows end being located opposite the first bellows end 12, and the shaft 7 is mounted in the shaft-sealing ring such that it can be rotated about the longitudinal axis 9 of the shaft relative to the bellows 11. In this exemplary embodiment and also in other preferred exemplary embodiments, the shaft 7 is sealed in relation to the bellows 11 by means of the shaft-sealing ring 14, but is also isolated from the bellows 11 in respect of the rotary movement of the shaft 7 about the longitudinal axis 9 of the shaft on account of the shaft-sealing ring 14. This ensures that, when the shaft 7 rotates about its longitudinal axis 9, the bellows 11 does not rotate correspondingly.

The shaft-sealing ring 14 could be fastened or formed directly at the second end 13 of the bellows 11. However, in the exemplary embodiment shown here and also in other preferred variants, provision is made for the shaft-sealing ring 14 to be arranged on a seal carrier 15 and for the bellows 11 to be fixed on this seal carrier 15 by way of its second bellows end 13. In this variant and also in other preferred variants of the invention, the seal carrier 15 is positively coupled to the shaft 7 in respect of the displacement movement of the shaft 7 in the directions 8 parallel to the longitudinal axis 9 of the shaft. This means that, when the shaft 7 is displaced in one of the directions 8 parallel to the longitudinal axis 9 of the shaft, the bellows 11 inevitably ends up being correspondingly expanded or pushed together. As a result, there is no relative movement between the shaft-sealing ring 14 and the shaft 7 in the directions 8 parallel to the longitudinal axis 9 of the shaft. In this variant and also in other preferred variants of the invention, relative movements between the shaft 7 and shaft-sealing ring 14 therefore take place only in the circumferential direction of the shaft 7 during rotation about the longitudinal axis 9 of the shaft, but not during displacement back and forth in the directions 8 parallel to the longitudinal axis 9 of the shaft. In this exemplary embodiment and also in other preferred variants, the positive coupling of the seal carrier 15, and therefore also of the shaft-sealing ring 14, to the shaft 7 in respect of the displacement movement in the direction 8 parallel to the longitudinal axis 9 of the shaft is achieved by the seal carrier 15 being fixed on the yoke 27, which will be explained more precisely hereinbelow, and therefore inevitably being moved along with the yoke 27.

As already explained in the introduction, the valve drive 21 on the one hand ensures the rotation of the shaft 7, together with the valve plate 5, about the longitudinal axis 9 of the shaft. On the other hand, however, the valve drive 21 also ensures the displacement of the shaft 7, together with the valve plate 5, in the directions 8 parallel to the longitudinal axis 9 of the shaft. In order to realize this, it is, of course, possible for the valve drive 21 to be designed in a variety of very different ways for valves 1 according to the invention, as is also known per se from the prior art. However, in the exemplary embodiment shown here and also in other preferred variants of the invention, provision can be made for the valve drive 21 to have, on the one hand, a longitudinal drive 25 and, on the other hand, a rotary drive 26. This is also the case realized here, as can be seen to good effect, in particular, in FIGS. 3 to 6. In addition to the longitudinal drive 25 and the rotary drive 26, a yoke 27 is also present, wherein the shaft 7 is mounted in the yoke 27 such that it can be rotated about its longitudinal axis 9. This rotary movement is performed by the rotary drive 26. In order to keep the friction as low as possible, bearings 34 are advantageously provided in this exemplary embodiment and also in other preferred exemplary embodiments, the shaft 7 being mounted in the yoke 27 by way of these bearings such that it can be rotated about its longitudinal axis 9.

However, the shaft 7 is positively coupled to the yoke 27 in respect of the direction 8 parallel to the longitudinal axis 9 of the shaft, so that the yoke 27, together with the shaft 7, can be displaced in the direction parallel to the longitudinal axis 9 of the shaft by the longitudinal drive 25. In the exemplary embodiment shown here and also in other variants according to the invention, the yoke 27 is advantageously correspondingly mounted in respect of the displacement movement in the directions 8 parallel to the longitudinal axis 9 of the shaft. This mounting preferably takes place—and this is also the case illustrated here—by means of guide rods 32, which are fixed in the drive housing 22.

In order to realize the displacement movement of the yoke 27, and therefore also of the shaft 7 and of the valve plate 5, in the directions 8 parallel to the longitudinal axis 9 of the shaft, the corresponding longitudinal drive 25 can be designed in a variety of very different ways. Also conceivable here, for example, are pneumatic or hydraulic drives, as are known per se. However, the preferred option is an electric linear drive. This can be realized—and this is also the case realized here in the exemplary embodiment—for example by a motor 29 of the longitudinal drive 25 rotating a spindle 30, which engages in a spindle nut 31 fixed in the yoke 27.

The rotary drive 26 for rotating the shaft 7, and therefore also for pivoting the valve plate 5, about the longitudinal axis 9 of the shaft advantageously has—and this is also the case realized here—a preferably electric motor 33. As shown in this exemplary embodiment, this motor can be fastened on the yoke 27, so that it is moved along with the yoke 27 in the directions 8 parallel to the longitudinal axis 9 of the shaft. At any rate—and this is also the case shown here—the motor 33 is connected to the shaft 7 via a corresponding drive shaft, so that, by means of the rotary drive 26, the shaft 7 can be rotated in both circumferential directions about the longitudinal axis 9 of the shaft, and the valve plate 5 can therefore be pivoted correspondingly.

Depending on the processes which are carried out in the process chamber which can be closed by the valve 1 according to the invention, it may be necessary for corrosive or other aggressive fluids, in particular gases, to be introduced into the interior space 6 of the valve housing from time to time, e.g. in order to clean deposits away from the surfaces present there. So that these corrosive or otherwise aggressive fluids cannot penetrate into the interior space 18 of the bellows 11, provision is preferably made, in this exemplary embodiment and also in other variants according to the invention, for there to be a service position, which is illustrated in FIGS. 6 and 10 and in which the interior space 18 of the bellows 11 is closed such that the corrosive or otherwise aggressive fluids cannot penetrate into the same. In specific terms, provision can be made here—and this is also the case realized in this exemplary embodiment—for the valve housing 2 to have arranged on it a sealing ring 16, through which the shaft 7 is guided, wherein in all the positions of the valve 1 with the exception of the service position, that is to say in the closed position, the fully open position and all the intermediate positions located therebetween, between the shaft 7 and the sealing ring 16 of the valve housing, an overflow opening 17 remains free between the interior space 18 of the bellows 11 and the interior space 6 of the valve housing, wherein, starting from the fully open position according to FIG. 5, the shaft 7 can be displaced, in the directions 8 parallel to the longitudinal axis 9 of the shaft, into the service position according to FIGS. 6 and 10. In this service position, provision is then made for the sealing ring 16 of the valve housing to butt with sealing action against the shaft 7 and thus to seal the interior space 18 of the bellows 11 in relation to the interior space 6 of the valve housing. That the overflow opening 17 between the interior space 18 and the interior space 6 of the valve housing remains free in the closed position, the intermediate position and the fully open position can be seen to good effect in FIGS. 7 to 9. The abutment of the sealing ring 16 of the valve housing against the shaft 7 for sealing purposes in the service position can be seen in FIG. 10. In order to realize this, provision is advantageously made—and this is the case in the exemplary embodiments shown here—for the shaft 7 to have a first shaft portion 19 and at least one second shaft portion 20, wherein the shaft 7 has a larger diameter in the second shaft portion 20 than in the first shaft portion 19. It is thus easily possible to achieve the situation where, in the service position, the sealing ring 16 of the valve housing butts with sealing action against the second shaft portion 20 of the shaft 7, whereas, in the closed position, the fully open position and the intermediate positions therebetween, the sealing ring 16 of the valve housing is located in the region of the first shaft portion 19, as a result of which the already mentioned overflow opening 17 between the sealing ring 16 of the valve housing and the shaft 7, and therefore a corresponding pathway between the interior space 6 of the valve housing and the interior space 18 of the bellows 11, remains free.

KEY TO THE REFERENCE SIGNS

| 1 | Valve |
| 2 | Valve housing |
| 3 | Valve seat |
| 4 | Valve opening |
| 5 | Valve plate |
| 6 | Interior space of the valve housing |
| 7 | Shaft |
| 8 | Direction |
| 9 | Longitudinal axis of the shaft |
| 10 | Shaft feedthrough |
| 11 | Bellows |
| 12 | First bellows end |
| 13 | Second bellows end |
| 14 | Shaft-sealing ring |
| 15 | Seal carrier |
| 16 | Sealing ring of the valve housing |
| 17 | Overflow opening |
| 18 | Interior space |
| 19 | First shaft portion |
| 20 | Second shaft portion |
| 21 | Valve drive |
| 22 | Drive housing |
| 23 | Carrier body |
| 24 | Carrier-body seal |
| 25 | Longitudinal drive |
| 26 | Rotary drive |
| 27 | Yoke |
| 28 | Further valve opening |
| 29 | Motor |
| 30 | Spindle |
| 31 | Spindle nut |
| 32 | Guide rod |
| 33 | Motor |
| 34 | Bearing |
| 35 | Closing plane |

The invention claimed is:

1. A valve, comprising:
a valve housing and having a valve opening, which is surrounded by a valve seat;
a valve plate arranged in an interior space of the valve housing and fixed on a shaft, wherein the valve plate, together with the shaft is displaceable back and forth in directions parallel to a longitudinal axis of the shaft between a closed position, in which the valve plate has been pushed against the valve seat and closes the valve opening, and an intermediate position, in which the valve plate has been raised up from the valve seat and coincides with the valve opening, and the valve plate is pivotable back and forth, by rotation of the shaft about the longitudinal axis of the shaft, between the intermediate position and a fully open position, in which the valve plate completely or partially frees the valve opening;
the shaft is sealed in relation to the valve housing by a shaft feedthrough, in which the shaft is rotatable about the longitudinal axis thereof and is displaceable in directions parallel to the longitudinal axis, and for sealing the shaft in relation to the valve housing, the shaft feedthrough has a bellows, which is expandable and is pushable back together in the directions parallel to the longitudinal axis of the shaft and is fixed on the valve housing by a first bellows end, and a shaft sealing ring is arranged at a second bellows end, the second bellows end being located opposite the first bellows end, and the shaft is mounted in the shaft-sealing ring such that the shaft is rotatable about the longitudinal axis of the shaft relative to the bellows; and
a sealing ring arranged on the valve housing, through which the shaft is guided, and an overflow opening between the shaft and the sealing ring of the valve housing that in the closed position of the valve plate and in the fully open position of the valve plate and in all the intermediate positions of the valve plate between the closed position and the fully open position remains free between an interior space of the bellows and the interior space of the valve housing and, starting from the fully open position, the shaft is displaceable, in one of the directions parallel to the longitudinal axis of the shaft, into a service position, in which the sealing ring of the valve housing butts with sealing action against the shaft and seals the interior space of the bellows in relation to the interior space of the valve housing.

2. The valve as claimed in claim 1, wherein the shaft is sealed in relation to the bellows by the shaft-sealing ring and is isolated from the bellows with respect to rotary movements of the shaft about the longitudinal axis of the shaft by the shaft-sealing ring.

3. The valve as claimed in claim 1, wherein the shaft-sealing ring is arranged on a seal carrier and the bellows is fixed on the seal carrier via the second bellows end, and the seal carrier is positively coupled to the shaft with respect to displacement movements of the shaft in the directions parallel to the longitudinal axis of the shaft.

4. The valve as claimed in claim 1, wherein the shaft has a first shaft portion and a second shaft portion, the shaft has a larger diameter in the second shaft portion than in the first shaft portion and, in the service position, the sealing ring of the valve housing butts with sealing action against the second shaft portion of the shaft.

5. The valve as claimed in claim 1, further comprising a valve drive for rotating the shaft, together with the valve plate, about the longitudinal axis of the shaft and for displacing the shaft, together with the valve plate, in the directions parallel to the longitudinal axis of the shaft.

6. The valve as claimed in claim 5, wherein the valve drive is arranged in a drive housing and the bellows is fixed on a carrier body via the first bellows end, and, for fixing the first bellows end on the valve housing, the carrier body is clamped in between the drive housing and the valve housing.

7. The valve as claimed in claim 6, wherein the carrier body is clamped in between the drive housing and the valve housing with a carrier-body seal interposed therebetween.

8. The valve as claimed in claim 5, wherein the valve drive has a longitudinal drive, a rotary drive, and a yoke, the shaft is mounted in the yoke to be rotatable about the longitudinal axis thereof by the rotary drive, the shaft is positively coupled to the yoke with respect to the directions parallel to the longitudinal axis of the shaft, and the yoke, together with the shaft, are displaceable in directions parallel to the longitudinal axis of the shaft by the longitudinal drive.

9. The valve as claimed in claim 8, wherein the shaft-sealing ring is arranged on a seal carrier and the bellows is fixed on the seal carrier via the second bellows end, and the seal carrier is positively coupled to the shaft with respect to displacement movements of the shaft in the directions parallel to the longitudinal axis of the shaft, and for positive coupling to the shaft, the seal carrier is fixed on the yoke with respect to the displacement movements of the shaft in the directions parallel to the longitudinal axis of the shaft.

10. A valve, comprising:
a valve housing and having a valve opening, which is surrounded by a valve seat;
a valve plate arranged in an interior space of the valve housing and fixed on a shaft, wherein the valve plate, together with the shaft is displaceable back and forth in directions parallel to a longitudinal axis of the shaft between a closed position, in which the valve plate has been pushed against the valve seat and closes the valve opening, and an intermediate position, in which the valve plate has been raised up from the valve seat and coincides with the valve opening, and the valve plate is pivotable back and forth, by rotation of the shaft about the longitudinal axis of the shaft, between the intermediate position and a fully open position, in which the valve plate completely or partially frees the valve opening;

the shaft is sealed in relation to the valve housing by a shaft feedthrough, in which the shaft is rotatable about the longitudinal axis thereof and is displaceable in directions parallel to the longitudinal axis, and for sealing the shaft in relation to the valve housing, the shaft feedthrough has a bellows, which is expandable and is pushable back together in the directions parallel to the longitudinal axis of the shaft and is fixed on the valve housing by a first bellows end, and a shaft sealing ring is arranged at a second bellows end, the second bellows end being located opposite the first bellows end, and the shaft is mounted in the shaft-sealing ring such that the shaft is rotatable about the longitudinal axis of the shaft relative to the bellows;

a valve drive for rotating the shaft, together with the valve plate, about the longitudinal axis of the shaft and for displacing the shaft, together with the valve plate, in the directions parallel to the longitudinal axis of the shaft; and a sealing ring arranged on the valve housing, through which the shaft is guided, and an overflow opening between the shaft and the sealing ring of the valve housing that in the closed position of the valve plate and in the fully open position of the valve plate and in all the intermediate positions of the valve plate between the closed position and the fully open position remains free between an interior space of the bellows and the interior space of the valve housing and, starting from the fully open position, the shaft is displaceable, in one of the directions parallel to the longitudinal axis of the shaft, into a service position, in which the sealing ring of the valve housing butts with sealing action against the shaft and seals the interior space of the bellows in relation to the interior space of the valve housing;

wherein the valve drive has a longitudinal drive, a rotary drive, and a yoke, the shaft is mounted in the yoke to be rotatable about the longitudinal axis thereof by the rotary drive, the shaft is positively coupled to the yoke with respect to the directions parallel to the longitudinal axis of the shaft, and the yoke, together with the shaft, are displaceable in directions parallel to the longitudinal axis of the shaft by the longitudinal drive; and wherein the shaft has a first shaft portion and a second shaft portion, the shaft has a larger diameter in the second shaft portion than in the first shaft portion and, in the service position, the sealing ring of the valve housing butts with sealing action against the second shaft portion of the shaft.

11. The valve as claimed in claim 10, wherein the shaft is sealed in relation to the bellows by the shaft-sealing ring and is isolated from the bellows with respect to rotary movements of the shaft about the longitudinal axis of the shaft by the shaft-sealing ring.

12. The valve as claimed in claim 10, wherein the shaft-sealing ring is arranged on a seal carrier and the bellows is fixed on the seal carrier via the second bellows end, and the seal carrier is positively coupled to the shaft with respect to displacement movements of the shaft in the directions parallel to the longitudinal axis of the shaft.

13. The valve as claimed in claim 10, wherein the valve drive is arranged in a drive housing and the bellows is fixed on a carrier body via the first bellows end, and, for fixing the first bellows end on the valve housing, the carrier body is clamped in between the drive housing and the valve housing.

14. The valve as claimed in claim 13, wherein the carrier body is clamped in between the drive housing and the valve housing with a carrier-body seal interposed therebetween.

15. The valve as claimed in claim 10, wherein the shaft-sealing ring is arranged on a seal carrier and the bellows is fixed on the seal carrier via the second bellows end, and the seal carrier is positively coupled to the shaft with respect to displacement movements of the shaft in the directions parallel to the longitudinal axis of the shaft, and for positive coupling to the shaft, the seal carrier is fixed on the yoke with respect to the displacement movements of the shaft in the directions parallel to the longitudinal axis of the shaft.

16. A valve, comprising:
a valve housing and having a valve opening, which is surrounded by a valve seat;
a valve plate arranged in an interior space of the valve housing and fixed on a shaft, wherein the valve plate, together with the shaft is displaceable back and forth in directions parallel to a longitudinal axis of the shaft between a closed position, in which the valve plate has been pushed against the valve seat and closes the valve opening, and an intermediate position, in which the valve plate has been raised up from the valve seat and coincides with the valve opening, and the valve plate is pivotable back and forth, by rotation of the shaft about the longitudinal axis of the shaft, between the intermediate position and a fully open position, in which the valve plate completely or partially frees the valve opening;
the shaft is sealed in relation to the valve housing by a shaft feedthrough, in which the shaft is rotatable about the longitudinal axis thereof and is displaceable in directions parallel to the longitudinal axis, and for sealing the shaft in relation to the valve housing, the shaft feedthrough has a bellows, which is expandable and is pushable back together in the directions parallel to the longitudinal axis of the shaft and is fixed on the valve housing by a first bellows end, and a shaft sealing ring is arranged at a second bellows end, the second bellows end being located opposite the first bellows end, and the shaft is mounted in the shaft-sealing ring such that the shaft is rotatable about the longitudinal axis of the shaft relative to the bellows; and
a valve drive for rotating the shaft, together with the valve plate, about the longitudinal axis of the shaft and for displacing the shaft, together with the valve plate, in the directions parallel to the longitudinal axis of the shaft;
wherein the valve drive has a longitudinal drive, a rotary drive, and a yoke, the shaft is mounted in the yoke to be rotatable about the longitudinal axis thereof by the rotary drive, the shaft is positively coupled to the yoke with respect to the directions parallel to the longitudinal axis of the shaft, and the yoke, together with the shaft, are displaceable in directions parallel to the longitudinal axis of the shaft by the longitudinal drive; and
wherein the shaft-sealing ring is arranged on a seal carrier and the bellows is fixed on the seal carrier via the second bellows end, and the seal carrier is positively coupled to the shaft with respect to displacement movements of the shaft in the directions parallel to the longitudinal axis of the shaft, and for positive coupling to the shaft, the seal carrier is fixed on the yoke with respect to the displacement movements of the shaft in the directions parallel to the longitudinal axis of the shaft.

\* \* \* \* \*